(12) United States Patent
Chen

(10) Patent No.: US 11,880,643 B2
(45) Date of Patent: Jan. 23, 2024

(54) DEVICE AND METHOD FOR INTEGRATED CIRCUIT ASSISTANCE DESIGN, AND METHOD FOR CONSTRUCTING ELECTRICAL PERFORMANCE GRADIENT MODEL

(71) Applicant: DigWise Technology Corporation, LTD, Hsinchu County (TW)

(72) Inventor: Shih-Hao Chen, Hsinchu County (TW)

(73) Assignee: DigWise Technology Corporation, LTD, Hsinchu County (TW)

( * ) Notice: Subject to any disclaimer, the term of this patent is extended or adjusted under 35 U.S.C. 154(b) by 21 days.

(21) Appl. No.: 17/349,877

(22) Filed: Jun. 16, 2021

(65) Prior Publication Data
US 2022/0374573 A1 Nov. 24, 2022

(30) Foreign Application Priority Data
May 21, 2021 (TW) .................. 110118363

(51) Int. Cl.
*G06F 30/30* (2020.01)
*G06F 30/367* (2020.01)
*G06F 30/398* (2020.01)
*G06F 30/3315* (2020.01)
*G06F 119/02* (2020.01)

(52) U.S. Cl.
CPC ........ *G06F 30/367* (2020.01); *G06F 30/3315* (2020.01); *G06F 30/398* (2020.01); *G06F 2119/02* (2020.01)

(58) Field of Classification Search
CPC .. G06F 30/367; G06F 30/3315; G06F 30/398; G06F 2119/02
See application file for complete search history.

(56) References Cited

U.S. PATENT DOCUMENTS

| | | | |
|---|---|---|---|
| 5,650,961 A * | 7/1997 | Himeno | G11C 16/08 365/185.11 |
| 7,243,316 B2 * | 7/2007 | White | H01L 21/31053 257/E21.244 |
| 8,001,516 B2 | 8/2011 | Smith et al. | |

(Continued)

FOREIGN PATENT DOCUMENTS

| | | |
|---|---|---|
| CN | 109765462 | 5/2019 |
| TW | 200405184 | 4/2004 |
| TW | 200525271 | 8/2005 |

(Continued)

OTHER PUBLICATIONS

"Office Action of Taiwan Counterpart Application", dated Feb. 14, 2022, p. 1-p. 9.

*Primary Examiner* — Jack Chiang
*Assistant Examiner* — Brandon Bowers
(74) *Attorney, Agent, or Firm* — JCIPRNET

(57) ABSTRACT

A device and a method for integrated circuit assistance design, and a method for constructing an electrical performance gradient model are provided. The device includes a database and a processor. The database has an electrical performance gradient model. The electrical performance gradient model represents a gradient distribution of an electrical performance in a wafer. The processor is coupled to the database. The processor analyzes a designed circuit by using the electrical performance gradient model.

29 Claims, 3 Drawing Sheets

(56) References Cited

U.S. PATENT DOCUMENTS 9,255,962 B2 2/2016 Bickford et al.
2009/0167339 A1* 7/2009 Marshall ............ G01R 31/3025
324/754.29

FOREIGN PATENT DOCUMENTS

| TW | 201738789 | 11/2017 |
| TW | 202001635 | 1/2020 |
| TW | 202016773 | 5/2020 |
| TW | 202030652 | 8/2020 |
| TW | 202107325 | 2/2021 |
| TW | 202113654 | 4/2021 |

* cited by examiner

DEVICE AND METHOD FOR INTEGRATED CIRCUIT ASSISTANCE DESIGN, AND METHOD FOR CONSTRUCTING ELECTRICAL PERFORMANCE GRADIENT MODEL

CROSS-REFERENCE TO RELATED APPLICATION

This application claims the priority benefit of Taiwan application Ser. No. 110118363, filed on May 21, 2021. The entirety of the above-mentioned patent application is hereby incorporated by reference herein and made a part of this specification.

BACKGROUND

Technical Field

The disclosure relates to an integrated circuit assistance design technology, and in particular to a device and a method for integrated circuit assistance design, and a method for constructing an electrical performance gradient model.

Description of Related Art

Generally speaking, for electrical performance, a wafer fabricated in an integrated circuit process is non-uniform. That is, different locations in the same wafer have different electrical performance gradients. The non-uniformity of electrical performance is mainly caused by a process systematic defect. A conventional integrated circuit assistance design technology does not consider the non-uniformity of performance caused by the process systematic defect. The process systematic defect may include spinning vibration, spinning and grinding unevenness, holder tipping, spraying unevenness, and a litho-effect. Based on the process systematic defect, a die (also known as a bare die) at a certain location of the wafer may have a problem of excessive performance gradient. The process systematic defect is usually generated by a base station in the process, so it is impossible to predict the process systematic defect in an existing circuit design stage.

SUMMARY

The disclosure provides a device and a method for integrated circuit assistance design, and a method for constructing an electrical performance gradient model, so as to accurately analyze a designed circuit.

In an embodiment of the disclosure, the device for integrated circuit assistance design includes a database and a processor. The database has an electrical performance gradient model. The electrical performance gradient model represents a gradient distribution of an electrical performance in a wafer. The processor is coupled to the database. The processor is adapted for analyzing a designed circuit by using the electrical performance gradient model.

In an embodiment of the disclosure, the method for integrated circuit assistance design includes the following. A database provides an electrical performance gradient model, and the electrical performance gradient model represents a gradient distribution of an electrical performance in a wafer. A designed circuit is analyzed by using the electrical performance gradient model.

In an embodiment of the disclosure, the method for constructing an electrical performance gradient model includes the following. At least one wafer is fabricated via an integrated circuit process, and each of the at least one wafer includes multiple dies, and each of the dies includes at least one sensor. Each of the sensors is measured to derive an electrical performance value at each of multiple locations of the at least one wafer. An electrical performance gradient model is constructed by using the electrical performance values at the locations.

Based on the above, in some embodiments of the disclosure, the integrated circuit process of a certain target production line is used to fabricate one (or multiple) wafer(s), and each wafer includes multiple dies, and die includes at least one sensor. The electrical performance values at multiple locations of the wafer are derived by measuring sensors, and the electrical performance values are used to construct the electrical performance gradient model of the target production line. When a designer intends to use the target production line to fabricate the integrated circuit, the designer can use the electrical performance gradient model related to the target production line to accurately analyze the designed circuit (integrated circuit) at the circuit design stage to increase production yield.

To further describe the above features and advantages of the disclosure, embodiments accompanied with drawings are described below in details.

DESCRIPTION OF THE EMBODIMENTS

Figure 1:
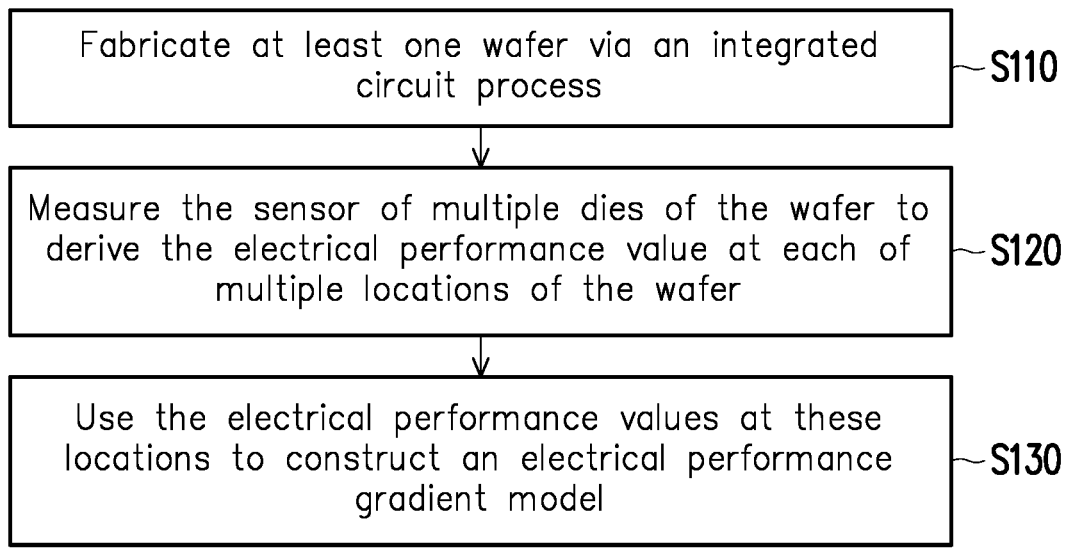
FIG. 1 is a flow diagram of a method for constructing an electrical performance gradient model according to an embodiment of the disclosure.

The term "coupled" (or "connected") used in the full text of this application specification (including the claims) may refer to any direct or indirect connection method. For example, if the text describes that a first device is coupled (or connected) to a second device, it should be interpreted as that the first device may be directly connected to the second device, or the first device may be indirectly connected to the second device through other devices or connection methods. The terms "first" and "second" mentioned in the full text of the specification of this application (including the claims) are used to name elements, or to distinguish between different embodiments or ranges, and are not intended to be used to set an upper or lower limit to the number of the elements, or to limit the order of the elements. In addition, wherever possible, elements/components/steps with the same reference numerals in the drawings and embodiments represent the same or like parts. An element/component/step may be related to for descriptions of elements/components/steps with the same reference numeral or the same term in other embodiments.

Generally speaking, a process systematic defect results in different electrical performance gradients at different locations in the same wafer. According to actual design, the electrical performance may include parasitic resistance, static IDD (SIDD), ring oscillator (RO) frequency, or other electrical performance values. If locations in the wafer are represented by an X-axis and a Y-axis, and the electrical performance is represented by a Z-axis (such as the ring oscillator frequency), the appearance of the gradient distribution of electrical performance in the wafer is usually similar doughnuts, Mexican hats, volcanic cones, or water ripples.

A wafer may have a large number of dies (also known as bare dies). Different locations in the same wafer have different electrical performance gradients. A die at a location with a moderate electrical performance gradient usually has electrical performance that meets the design requirements. An electrical performance of a die at a location with a steep electrical performance gradient may not meet the design requirements. Dies that do not meet the design requirements are discarded. Generally, because of the process systematic defect, wafers fabricated on different production lines have different electrical performance gradient distributions, so existing electronic assistance design tools cannot predict the electrical performance gradient distribution caused by the process systematic defects. When a designer intends to use a certain target production line to fabricate an integrated circuit, if the designer may know the electrical performance gradient distribution (an electrical performance gradient model) related to the target production line in a circuit design stage, an electronic assistance design tool may analyze a designed circuit (an integrated circuit) more accurately according to the electrical performance gradient distribution related to the target production line, thereby improving the production yield.

FIG. 1 is a flow diagram of a method for constructing an electrical performance gradient model according to an embodiment of the disclosure. For a certain target production line, in step S110, one (or more) wafer may be fabricated via an integrated circuit process of the target production line. Because of the systematic defect in the process of the target production line, different locations of a wafer fabricated on the target production line have different electrical performance gradients.

Figure 2:
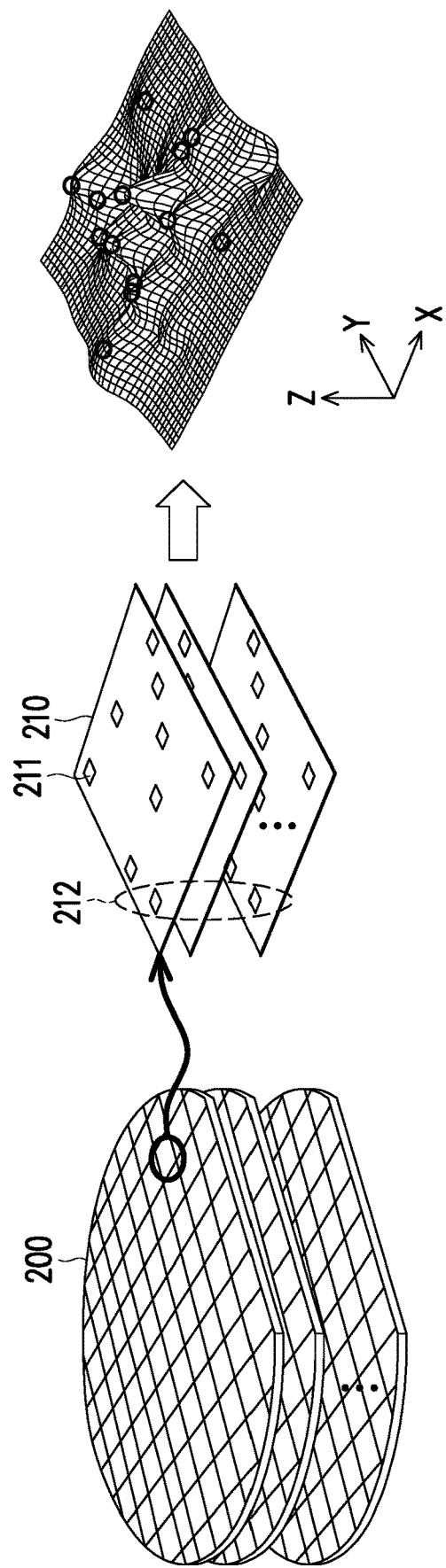
FIG. 2 illustrates a schematic view of a plurality of (or a) wafer according to an embodiment of the disclosure.

FIG. 2 illustrates a schematic view of a plurality of (or a) wafer according to an embodiment of the disclosure. Referring to FIGS. 1 and 2, for a certain target production line, in step S110, a plurality of wafers 200 may be fabricated via an integrated circuit process of a same target production line. The left part of FIG. 2 illustrates the plurality of wafer 200, but the number of wafers 200 may be determined according to design requirements. For example, in some embodiments, the number of wafers 200 shown in FIG. 2 may be one. Each of the wafers 200 includes a plurality of dies 210. The middle part of FIG. 2 illustrates the dies 210 with a same location in the plurality of wafers 200. Each of these dies 210 includes at least one sensor 211. According to actual design requirements, the sensor 211 may include a resistor, a transistor, an oscillator, and/or other electrical elements. The oscillator may be a ring oscillator (RO) or other oscillators. The middle part of FIG. 2 illustrates a plurality of sensors 211 in one die 210, but the number of sensors 211 may be determined according to design requirements. For example, in some embodiments, the number of sensors 211 in a same die 210 may be one.

The process systematic defect of the target production line affects the electrical performance of the sensor 211. According to actual design, the electrical performance may include voltage, current, parasitic resistance, static IDD (SIDD), oscillation frequency, or other electrical performance values. The process systematic defect causes different locations in a same wafer to have different electrical performances. In step S120, each of these sensors 211 may be measured to derive the electrical performance values at different locations of the wafer 200. For example, the electrical performance may include the oscillation frequency of the oscillator. In the case where the sensors 211 include a ring oscillator, in step S120, the oscillation frequency of each of these sensors 211 (ring oscillators) may be measured. For example, when the sensors 211 include a transistor, in step S120, the static IDD of each of these sensors 211 (transistors) may be measured as the electrical performance.

The electrical performance values of the sensors 211 of a same location (for example, a location 212 shown in FIG. 2) in different wafers 200 may be averaged (or added, or processed by other methods) as the electrical performance value of the location 212. The right part of FIG. 2 illustrates the electrical performance values at different locations in the die 210. The X-axis and Y-axis shown in the right part of FIG. 2 represent the location in the wafer 200, and the Z-axis shown in the right part of FIG. 2 represents the electrical performance value (such as ring oscillator frequency). As shown in the right part of FIG. 2, because of the process systematic defect, different locations in the wafer 200 have different electrical performance values.

Referring to FIG. 1, in step S130, the electrical performance values at different locations of the wafer 200 may be used to construct the electrical performance gradient model of the wafer 200. The electrical performance gradient model may represent the correlation between a certain electrical performance and the location in the wafer 200.

For example, these electrical performance values at different locations of the wafer 200 may be used to construct a gradient surface, and the X-axis and Y-axis of the gradient surface represent the location in the wafer 200, and the Z-axis of the gradient surface represents the electrical performance value. According to the actual design, in some embodiments, in step S130, a machine learning method may be used to construct an electrical performance gradient model of the wafer 200 according to these electrical performance values (gradient surfaces) of the wafer 200. In this embodiment, implementation details of the machine learning method are not limited. For example, in some embodiments, in step S130, a conventional machine learning method, a regression operation, or other machine learning methods may be used to construct the electrical performance gradient model of the wafer 200.

In some embodiments, in step S130, a derating regression method may be used to construct a gradient surface (an electrical performance gradient model) according to these electrical performance values of the wafer 200. In other embodiments, in step S130, these electrical performance values at different locations of the wafer 200 may be viewed as pixel values at different locations in an image frame, and image processing may be performed on these electrical performance values to construct the electrical performance gradient model of the wafer 200. In this embodiment, implementation details of the image processing are not limited. For example, in some embodiments, in step S130, a conventional cosine transform operation or other image processing methods may be used to construct the electrical performance gradient model of the wafer 200. After completing step S130, the electrical performance gradient model may be stored in a database used by electronic design automation (EDA) tool or other integrated circuit assistance design tools.

According to different design requirements, the method for constructing an electrical performance gradient model shown in FIG. 1 may be implemented by hardware, firmware, software (or program) or a combination of more than one of the foregoing three. In terms of hardware, the functions of step S120 and (or) step S130 shown in FIG. 1 may be implemented in a logic circuit on an integrated circuit. The die 210 may be implemented as hardware by using hardware description languages (such as Verilog HDL or VHDL) or other suitable programming languages. The related functions of step S120 and (or) step S130 may be implemented in one or more controllers, microcontrollers, microprocessors, application-specific integrated circuits (ASICs), digital signal processors (DSPs), field programmable gate arrays (FPGAs) and/or various logic blocks, modules and circuits in other processing units. In terms of software and/or firmware, the related functions of step S120 and (or) step S130 may be implemented as programming codes. For example, general programming languages (such as C, C++, or assembly language) or other suitable programming languages are used to implement the above step S120 and/or step S130. The programming codes may be recorded/stored in a "non-transitory computer readable medium". In some embodiments, the non-transitory computer-readable medium includes, for example, a read only memory (ROM), a magnetic tape, a magnetic disk, a card, a semiconductor memory, a programmable logic circuit, and (or) a storage device. The storage device includes a hard disk drive (HDD), a solid-state drive (SSD), or other storage devices. A computer, a central processing unit (CPU), a controller, a microcontroller, or a microprocessor may read and execute the programming codes from the non-transitory computer readable medium, thereby realizing the related functions of the above step S120 and/or step S130. Moreover, the programming codes may also be provided to the computer (or the CPU) via any transmission medium (communication network or broadcast waves, etc.). The communication network is, for example, the Internet, a wired communication network, a wireless communication network, or other communication media.

Figure 3:
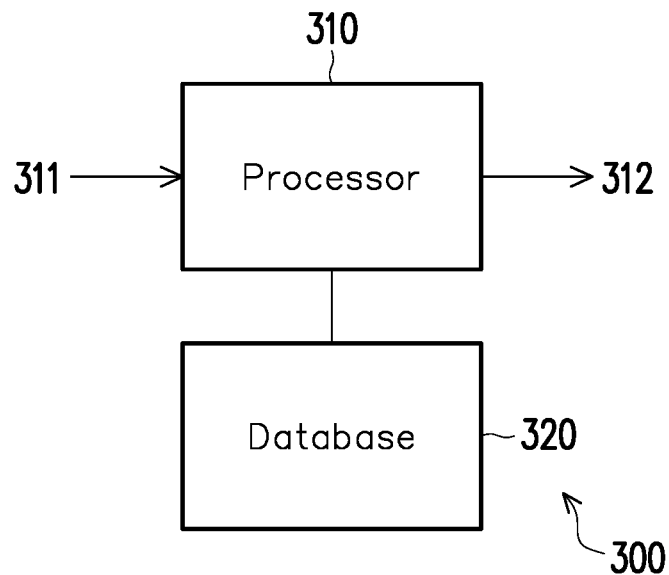
FIG. 3 is a schematic circuit block diagram of a device for integrated circuit assistance design according to an embodiment of the disclosure.
Figure 4:
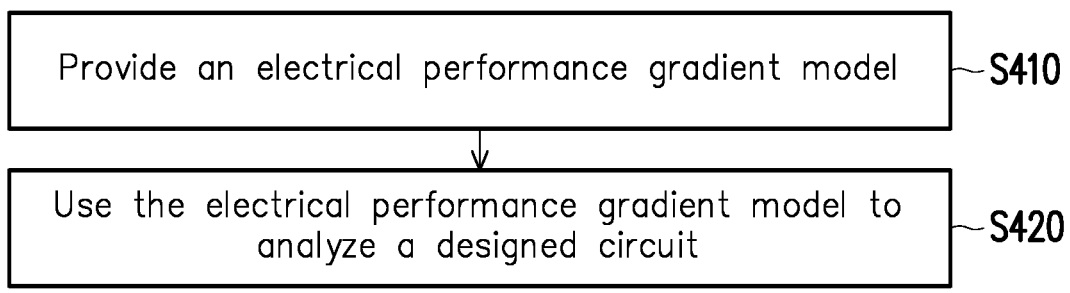
FIG. 4 is a flow diagram of a method for integrated circuit assistance design according to an embodiment of the disclosure.

FIG. 3 is a schematic circuit block diagram of a device for integrated circuit assistance design 300 according to an embodiment of the disclosure. The device for integrated circuit assistance design 300 shown in FIG. 3 includes a processor 310 and a database 320. The database 320 has an electrical performance gradient model, and the electrical performance gradient model may represent a gradient distribution of electrical performance in a wafer. FIG. 4 is a flow diagram of a method for integrated circuit assistance design according to an embodiment of the disclosure. Referring to FIGS. 3 and 4, in step S410, the database 320 may provide an electrical performance gradient model to the processor 310. The related descriptions of FIGS. 1 and 2 may be referred to for the electrical performance gradient model, so details thereof will not be repeated herein.

The processor 310 is coupled to the database 320. In step S420, the processor 310 may use the electrical performance gradient model provided by the database 320 to analyze a designed circuit (integrated circuit) 311 and generate an analysis result 312. This embodiment does not limit the implementation details of the analysis performed by the processor 310. The processor 310 may perform any analysis (for example, timing analysis). In some embodiments, the processor 310 may calculate the instance IR-drop gradient in the designed circuit by using the electrical performance gradient model. The processor 310 may use the instance IR-drop gradient to perform static timing analysis on the designed circuit. For example, the processor 310 may use the electrical performance gradient model provided by the database 320 to perform die to die performance gradient analysis to generate an equivalent IR-drop gradient distribution model in the wafer. The processor 310 may use the equivalent IR-drop gradient distribution model to calculate the instance IR-drop gradient of the designed circuit (integrated circuit).

The designed circuit (integrated circuit) may be implemented as hardware by using hardware description languages (for example, Verilog HDL or VHDL) or other suitable programming languages. According to different design requirements, the method for integrated circuit assistance design shown in FIG. 4 may be implemented by hardware, firmware, software, or a combination of more than one of the foregoing three. In terms of hardware, the functions of step S410 and (or) step S420 shown in FIG. 4 may be implemented in a logic circuit on an integrated circuit. The related functions of step S410 and (or) step S420 may be implemented in one or more controllers, microcontrollers, microprocessors, ASICs, DSPs, FPGAs and/or various logic blocks, modules and circuits in other processing units. In terms of software and/or firmware, the related functions of step S410 and (or) step S420 may be implemented as programming codes. For example, general programming languages (such as C, C++, or assembly language) or other suitable programming languages are used to implement the above step S410 and/or step S420. The programming codes may be recorded/stored in a "non-transitory computer readable medium". A computer, a central processing unit (CPU), a controller, a microcontroller, or a microprocessor may read and execute the programming codes from the non-transitory computer readable medium. For example, the processor 310 may read and execute the programming codes from the non-transitory computer readable medium (for example, the database 320), so as to realize the related functions of step S410 and/or step S420.

In summary, in the embodiments as described above, the integrated circuit process of a certain target production line is used to fabricate one (or more) wafer 200, and each of the wafers 200 includes a plurality of dies 210, and each of the dies 210 includes at least one sensor 211. By measuring these sensors 211, the electrical performance values at different locations of the wafer 200 may be derived, and then these electrical performance values may be used to construct the electrical performance gradient model of the target production line. Accordingly, different electrical performance gradient models may be constructed for different production lines. When a designer intends to use a certain target production line to fabricate an integrated circuit, the designer may use the electrical performance gradient model related to the target production line during the circuit design stage to accurately analyze the designed circuit (integrated circuit), thereby increasing the production yield.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, protection scope of the disclosure is subject to the scope of the appended claims.

What is claimed is:

1. A device for integrated circuit assistance design, comprising:
   a database, having an electrical performance gradient model, wherein the electrical performance gradient model represents a gradient distribution of an electrical performance in a wafer fabricated via an integrated circuit process of a target production line; and a processor, coupled to the database, adapted for analyzing a designed circuit by using the electrical performance gradient model, wherein the electrical performance gradient model represents a correlation between the electrical performance and locations in the wafer, wherein the electrical performance gradient model, extendable from chip to wafer level, is formulated utilizing multiple electrical performance values within individual dies, each value being acquired by means of measuring at least one sensor within each of the dies, while considering that a wafer has the capability to accommodate multiple dies.

2. The device for integrated circuit assistance design according to claim 1, wherein the electrical performance comprises an oscillation frequency of an oscillator.

3. The device for integrated circuit assistance design according to claim 1, wherein the electrical performance comprises a static leakage current of a transistor.

4. The device for integrated circuit assistance design according to claim 1, wherein the processor calculates an instance IR-drop gradient in the designed circuit by using the electrical performance gradient model, and the processor performs a static timing analysis on the designed circuit by using the instance IR-drop gradient.

5. The device for integrated circuit assistance design according to claim 4, wherein the processor performs a die to die performance gradient analysis by using the electrical performance gradient model to generate an equivalent IR-drop gradient distribution model in the wafer, and the processor calculates the instance IR-drop gradient of the designed circuit by using the equivalent IR-drop gradient distribution model.

6. The device for integrated circuit assistance design according to claim 1, wherein each of the sensors comprises:
a ring oscillator, wherein the electrical performance comprises an oscillation frequency of the ring oscillator.

7. The device for integrated circuit assistance design according to claim 1, wherein each of the sensors comprises:
a transistor, wherein the electrical performance comprises a static leakage current of the transistor.

8. The device for integrated circuit assistance design according to claim 1, wherein the electrical performance values at various locations of the dies on the wafer are utilized in constructing a wafer-level gradient surface, a mechanical learning method is used to construct the electrical performance gradient model according to the gradient surface, and the electrical performance gradient model is stored in the database.

9. The device for integrated circuit assistance design according to claim 8, wherein the mechanical learning method comprises a regression operation.

10. The device for integrated circuit assistance design according to claim 1, wherein the electrical performance values at the locations various positions of the dies on the wafer are regarded as image frames, enabling viewed as an image frame so that image processing is performed on the of these electrical performance values to construct the electrical performance gradient model, and the electrical performance gradient model which is stored in the database.

11. The device for integrated circuit assistance design according to claim 10, wherein the image processing comprises a cosine transformation operation.

12. A method for integrated circuit assistance design, comprising:

providing an electrical performance gradient model by a database, wherein the electrical performance gradient model represents a gradient distribution of an electrical performance within a plurality of dies in a wafer fabricated using an integrated circuit process of a target production line, extending this distribution to the wafer level; and analyzing a designed circuit by using the electrical performance gradient model, wherein the electrical performance gradient model represents a correlation between the electrical performance and locations in the wafer, the electrical performance gradient model can be extended from the chip level to the wafer level, constructed using multiple electrical performance values within each of the dies, each value obtained by measuring at least one sensor within each of a plurality of dies on the wafer.

13. The method for integrated circuit assistance design according to claim 12, wherein the electrical performance comprises an oscillation frequency of an oscillator.

14. The method for integrated circuit assistance design according to claim 12, wherein the electrical performance comprises a static leakage current of a transistor.

15. The method for integrated circuit assistance design according to claim 12, further comprising:
calculating an instance IR-drop gradient in the designed circuit by using the electrical performance gradient model; and
performing a static timing analysis on the designed circuit by using the instance IR-drop gradient.

16. The method for integrated circuit assistance design according to claim 15, further comprising:
performing a die to die performance gradient analysis to generate an equivalent IR-drop gradient distribution model in the wafer by using the electrical performance gradient model; and
calculating the instance IR-drop gradient of the designed circuit by using the equivalent IR-drop gradient distribution model.

17. The method for integrated circuit assistance design according to claim 12, further comprising:
constructing a gradient surface by using the electrical performance values at the locations of the dies on the wafer;
constructing the electrical performance gradient model according to the gradient surface by using a mechanical learning method; and
storing the electrical performance gradient model in the database.

18. The method for integrated circuit assistance design according to claim 17, wherein the mechanical learning method comprises a regression operation.

19. The method for integrated circuit assistance design according to claim 12, further comprising:
viewing the electrical performance values at the locations of the wafer as an image frame to perform image processing on the electrical performance values to construct the electrical performance gradient model; and
storing the electrical performance gradient model in the database.

20. The method for integrated circuit assistance design according to claim 19, wherein the image processing comprises a cosine transformation operation.

21. A method for constructing an electrical performance gradient model, comprising:

fabricating at least one wafer via an integrated circuit process of a target production line, wherein each of the at least one wafer comprises a plurality of dies, and each of the dies comprises at least one sensor;

measuring each of the sensors to derive an electrical performance value at each of a plurality of locations of the at least one wafer; and constructing an electrical performance gradient model which is a wafer-level model by using the electrical performance values at the locations, wherein the electrical performance gradient model represents a correlation between the electrical performance and the locations in the wafer.

22. The method for constructing an electrical performance gradient model according to claim 21, wherein the electrical performance comprises an oscillation frequency of an oscillator.

23. The method for constructing an electrical performance gradient model according to claim 21, wherein the electrical performance comprises a static leakage current of a transistor.

24. The method for constructing an electrical performance gradient model according to claim 21, wherein each of the sensors comprises a ring oscillator, and the electrical performance comprises an oscillation frequency of the ring oscillator.

25. The method for constructing an electrical performance gradient model according to claim 21, wherein each of the sensors comprises a transistor, and the electrical performance comprises a static leakage current of the transistor.

26. The method for constructing an electrical performance gradient model according to claim 21, further comprising:

constructing a gradient surface by using the electrical performance values at the locations of the at least one wafer;

constructing the electrical performance gradient model according to the gradient surface by using a mechanical learning method; and storing the electrical performance gradient model in the database.

27. The method for constructing an electrical performance gradient model according to claim 26, wherein the mechanical learning method comprises a regression operation.

28. The method for constructing an electrical performance gradient model according to claim 21, further comprising:

viewing the electrical performance values at the locations of the at least one wafer as an image frame to perform image processing on the electrical performance values to construct the electrical performance gradient model; and storing the electrical performance gradient model in the database.

29. The method for constructing an electrical performance gradient model according to claim 28, wherein the image processing comprises a cosine transformation operation.

* * * * *